Oct. 18, 1960  G. JANOSKA  2,956,445
MECHANICAL COUPLING SYSTEM
Filed Oct. 9, 1957  8 Sheets-Sheet 1

INVENTOR.
GEORGES JANOSKA
BY Pollare, Johnston
Smythe & Robertson
ATTORNEYS.

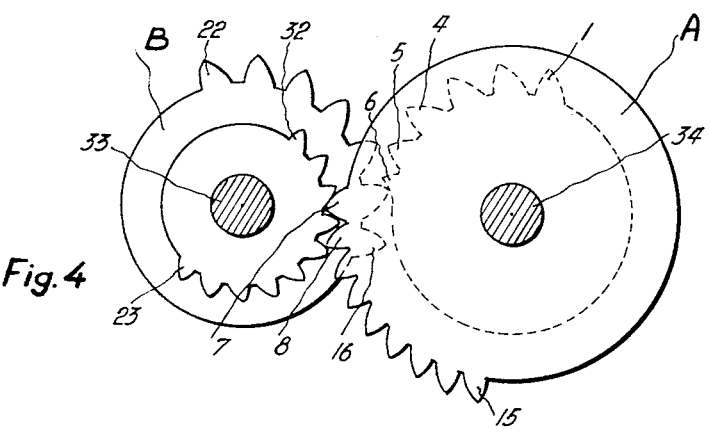
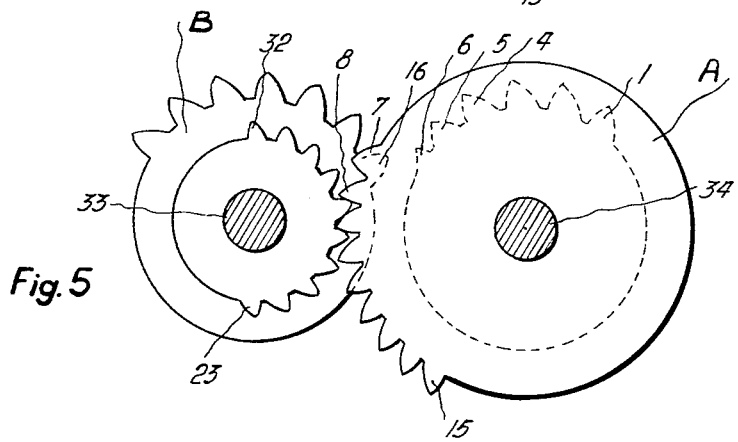

INVENTOR.
GEORGES JANOSKA
BY
ATTORNEYS.

Oct. 18, 1960    G. JANOSKA    2,956,445
MECHANICAL COUPLING SYSTEM
Filed Oct. 9, 1957    8 Sheets-Sheet 5

INVENTOR.
GEORGES JANOSKA
BY
ATTORNEYS.

United States Patent Office 2,956,445
Patented Oct. 18, 1960

2,956,445

MECHANICAL COUPLING SYSTEM

Georges Janoska, Paris, France, assignor to Cyber Societe Anonyme, Yverdon, Switzerland, a corporation of Switzerland Filed Oct. 9, 1957, Ser. No. 689,204

Claims priority, application France Sept. 27, 1957

9 Claims. (Cl. 74—393)

The present invention relates to a system of mechanical coupling applicable to calculating devices.

The system of mechanical coupling which forms the object of the invention is especially intended for the treatment of information by operating on discrete information, additive or subtractive relations, such as may be met with, for example, in calculating devices, in particular leading information modulated in position into scales of reference represented by the rotation of pre-determined elements, in accordance with the patent application filed in Morocco November 22, 1956, for "A Mechanical System Permitting of the Construction of Calculating Mechanisms," the means forming the object of this patent application being capable of utilisation in combination with those which form the object of the present invention and/or by effecting the de-coding or in addition with respect to the referential to which the information belongs, and/or by effecting any algebraic manipulation on the information and/or by recognising the topological relation of the information, and can thus utilise the latter in accordance with their logical or metalogical meaning.

The said system is a particular type of homokinetic coupling enabling a change of ratio between a first and a second rotary element, the said coupling being operative for a plurality of positions of the first element and for one position of the second element, the driving element being either the first or the second element, as desired.

As used in this application, the term, homokinetic coupling, refers to a gear coupling in which the driving member imparts a motion to the driven member, which motion bears a definite, constant relationship to motion of the driving member. That motion may be continuous or only for given period of time. Conversely, a non-homokinetic coupling is one in which the speed of the driven member does not bear a constant relationship to the speed of the driving member. An example of such a non-homokinetic coupling would be a gear coupling in which driven member accelerated or decelerated in response to the constant motion of the driving member.

The term, information, as used in this specification, refers to impulses applied to a member to rotate the member, either step-by-step or continuously. Such impulses may be transmitted manually or by mechanical means actuated by a mechanical or electrical system. The impulses may be related to factors in a problem of calculation, or to numerals or letters in a problem of coding or decoding, to be solved by means of the present invention.

This coupling system is thus constituted by a rotary element known as the first element, comprising at least one set of teeth known as the low ratio, and at least one set of teeth known as the high ratio adapted to co-operate with the respective sets of teeth of the first element so as to ensure a homokinetic mechanical coupling of corresponding ratio between the two elements, the said teeth of the second rotary element being completed by a set of teeth known as the variable ratio, capable of co-operating successively with the teeth of high and low ratio of the first element in order to ensure directly the transition from low ratio to high ratio or conversely; the said rotary elements being adapted to receive information from external rotary elements and being able to turn indifferently in both directions of rotation.

The teeth of variable ratio of the second element ensure on the one hand, during their operation with the teeth of low ratio of the first element the continuous and progressive variation of the driving ratio between the two elements from the value of the low ratio up to an intermediate value comprised between the low and the high ratio, and on the other hand, during its co-operation with the high ratio teeth of the first element, the continuous and progressive variation of the driving ratio between the two elements from a value comprised between the low ratio and the said intermediate value up to the value of the high ratio.

It will be understood that there may exist between two rotary elements a number of couplings of the kind in question, the means being employed as many times as may be necessary to produce all the changes of ratio provided.

The first rotary element can receive the information by means of a non-homokinetic coupling from a third rotary element driven in any known manner, or by a system of two elements similar to the said first and second rotary elements in accordance with the invention.

The first rotary element may be driven, in the positions in which it is not controlled by the second or the third rotary element, by a fourth rotary element driven homokinetically with a fifth rotary element known as the reference element.

The second rotary element can receive the information by means of a non-homokinetic coupling from a sixth rotary element controlled in any known manner, or by a system of two elements similar to the said first and second rotary elements in accordance with the invention.

The second rotary element may be driven, in the positions in which it is not controlled by the sixth rotary element, by the fifth rotary element or reference element, the rotation of which expresses the scale of reference with respect to which the movements of all the other elements are evaluated.

A mechanical coupling system in accordance with the invention is described below, reference being made to the accompanying drawings, in which:

Figs. 1 to 5 show profile views of the means utilised for a coupling in accordance with the invention, between two rotary elements A and B in different relative positions;

Figure 1:
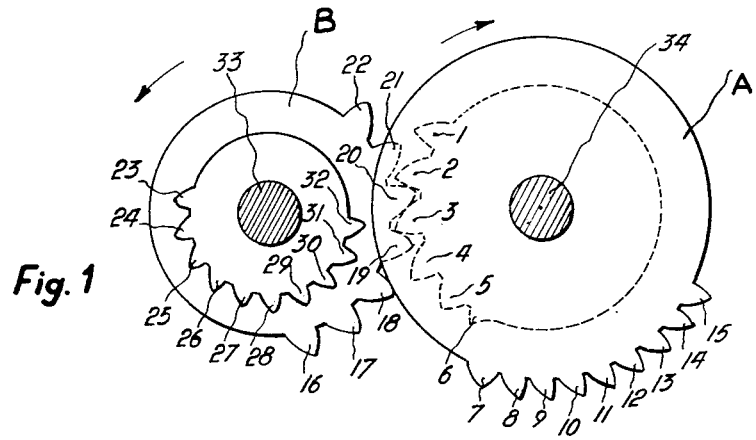

Figs. 1 to 5 which show rotary elements A and B constructed in accordance with the invention and provided with the same means seen in different relative positions, illustrate the constitution of the said means and the operation of the coupling which they form.

In each figure, there is seen the rotary element B, known as the first element, carried by the shaft 33 and provided with means in accordance with the invention; in the same way there is seen the element A, known as the second element and carried by the shaft 34 and provided with means also in conformity with the invention, the said elements being adapted to co-operate by the said means in order to form a coupling in accordance with the invention. Each of the elements comprises two planes known respectively as the low ratio and the high ratio, between which the means are distributed.

The set of low ratio teeth of the first element B is composed of identical teeth 16 to 22, and the set of teeth of high ratio of the same element is made up of identical teeth 23 to 32. The two sets of teeth are located in their respective planes, that is to say the first is in the low ratio plane and the second is in the high ratio plane.

The low ratio teeth of the element A are composed of identical teeth 1 to 4, and is situated in the low ratio plane. The set of high ratio teeth of the element A is composed of identical teeth 8 to 15 and is located in the high ratio plane.

The element A comprises a set of teeth of variable ratio, constituted on the one hand by special teeth 5 and 6 located in the low ratio plane following the last tooth 4 of the low ratio teeth and, on the other hand, by a special tooth 7 located in the high ratio plane and preceding the first tooth 8 of the high ratio teeth. The profile of the special teeth 5 and 6 is such that their co-operation with any of the teeth of the low ratio set of the element B provides a variation of the drive ratio between the two elements from the value of the low ratio up to an intermediate value between the low ratio and the high ratio. The profile of the special tooth 7 is such that its co-operation with any of the teeth of the high ratio set of the element B ensures the variation of the drive ratio between the two elements from a value comprised between the value of the low ratio and the said intermediate value up to the value of the high ratio. The constant ratio drives of low or high ratio are respectively ensured by the co-operation of the teeth of low or high ratio.

Fig. 1 shows the rotary elements A and B in one case of co-operation of the teeth of low ratio.

Figure 2:
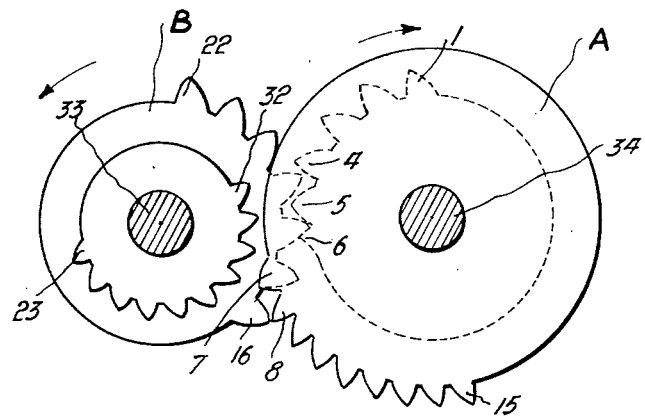

Fig. 2 shows the said elements at the end of the co-operation of the low ratio teeth, that is to say at the beginning of the portion of co-operation of the variable ratio teeth of the element A with the low ratio teeth of the element B.

Figure 3:
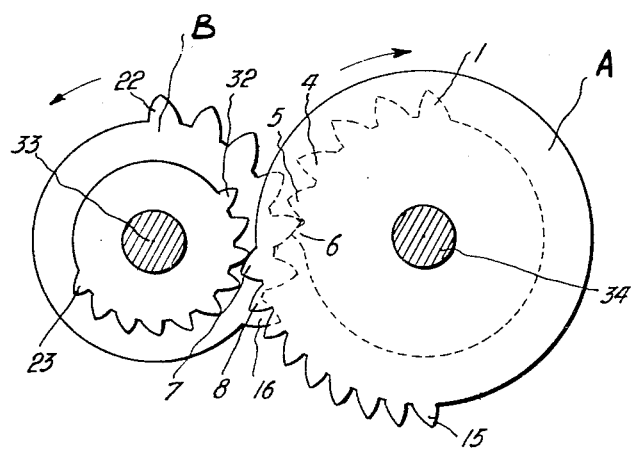

Fig. 3 shows the elements at the moment when the variable ratio teeth of the element A co-operate simultaneously with the low and high ratio teeth of the element B.

Fig. 4 shows the elements at the moment when the variable ratio teeth of the element A finish their co-operation with the high ratio teeth of the element B, that is to say at the beginning of the co-operation of the high ratio teeth of the two elements.

Finally, Fig. 5 shows the two elements A and B co-operating by their high ratio teeth.

Figure 6:
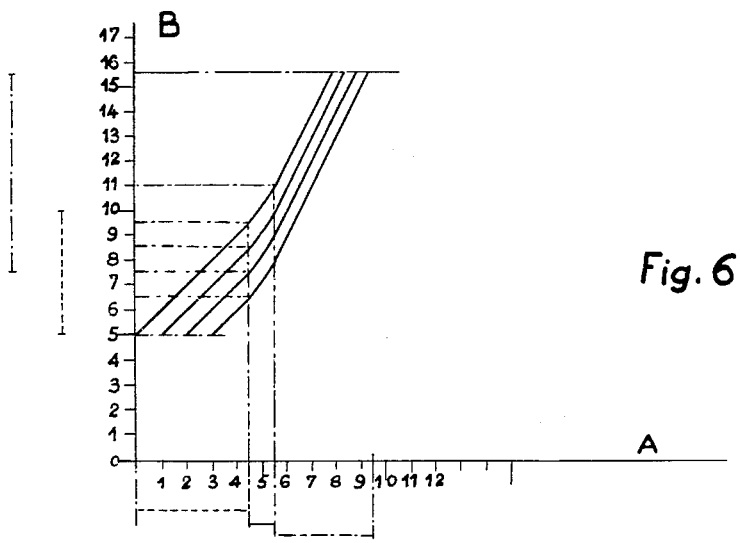
Fig. 6 is a diagram of relative movement between the two rotary elements A and B in accordance with the invention, showing four cases of operation.

Fig. 6 shows a diagram of relative movement between a first rotary element B and a second rotary element A. In this diagram, the angular positions of the element A are plotted as abscissae, and the angular positions of the element B as ordinates. The means employed in the coupling between these elements are shown on the sides of the diagram, respectively in abscissae for those of the element A and in ordinates for those of the element B, and in correspondence with the positions of the element to which they belong, for which they are capable of co-operating with the corresponding means of the other element.

Thus, it can be seen from the abscissae that the set of low ratio teeth represented by a dotted line, is distributed on the element A so as to be able to co-operate with the teeth of low ratio of the element B for the positions from 0 to 4.5 of the element A; the variable ratio teeth carried by the element A, represented by a full line, can co-operate with the element B for the positions from 4.5 to 5.5 of the element A; and the high ratio teeth, represented by a chain-dotted line are arranged on the element A so as to be able to co-operate with the high ratio teeth of the element B for the positions from 5.5 to 9.5 of the element A.

In the same way, it can be seen from the ordinates, that for the element B, the low ratio teeth, represented by a dotted line, are in a position to co-operate with the low ratio teeth and/or the variable ratio teeth of the element A for the positions from 5 to 10 of the element B, and the high ratio teeth, represented by a chain-dotted line, can co-operate with the teeth of variable ratio and/ or of high ratio of the element A, for the positions from 7.5 to 15.5 of the element B.

The elements A and B considered are the same as those of Figs. 1 to 5. Each of them can either be driven or can drive, the movement may begin with the low ratio and finish by the high ratio or conversely. For the purposes of explanation, it will be assumed that the element A is the driving element and that the co-operation begins with the low ratio and finishes with the high ratio. In Fig. 6 have been shown four cases of operation corresponding to four different relative positions at the beginning of the coupling between the two elements; in the first case, the co-operation between the low ratio teeth begins for the position 5 of the element B and the position 0 of the element A, this co-operation continues until these two elements have each made 4.5 steps, and they are then in the positions 9.5 for B and 4.5 for A; at this moment, the co-operation of variable ratio begins, during the course of which the element B is accelerated by the element A up to a speed selected in the example as twice that corresponding to the low ratio, the elements thus arriving at 11 for B and 5.5 for A; at this moment begins the co-operation between the high ratio teeth, during which the element B is driven homokinetically by the element A at a speed twice that corresponding to the co-operation of the low ratio teeth. For the direction of rotation of the elements indicated by the arrows on Figs. 1 to 5, the co-operation at variable speed is the transition with acceleration of the element B from the low speed to the high speed. For a rotation in the opposite direction, this same co-operation ensures the transition with deceleration of the element B from high speed to low speed.

In the other cases of operation shown on the diagram, the procedure is the same, except that the relative positions are different because the initial position is different. For the second case, the origin of the coupling occurs at 5 for B and at 1 for A, for the third case this origin occurs at 5 for B and at 2 for A, and for the fourth case at 5 for B and at 3 for A. The result is that the position of B for which the co-operation at variable ratio begins is 8.5 for the second case, 7.5 for the third case and 6.5 for the fourth case, and the position for which it finishes is respectively 10, 9 and 8. In all the cases, the positions of A are the same, the co-operation beginning at 4.5 and finishing at 5.5. At the end of the co-operation at variable ratio, the co-operation begins of the high ratio teeth by which the element B is driven at high speed up to the position 16, the element A being then at 8.5 for the second case, at 9 for the third and at 9.5 for the fourth.

It will be noted that the position for which the change of ratio is effected is different for each case as far as the element B is concerned, while it is unchanged for the element A.

Figure 7:
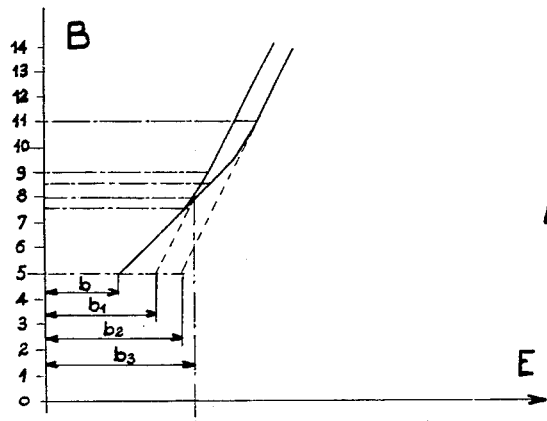
Fig. 7 is the diagram of movement of the element B of Fig. 6 with respect to a scale of reference E.

Fig. 7 is a movement diagram of the element B, the positions of which are plotted as ordinates, considered with respect to a scale of reference E expressed in steps and plotted as abscissae. This diagram shows two cases of operation corresponding to two cases of movement of the element A and bringing out clearly the additive nature of the coupling.

Figure 8:
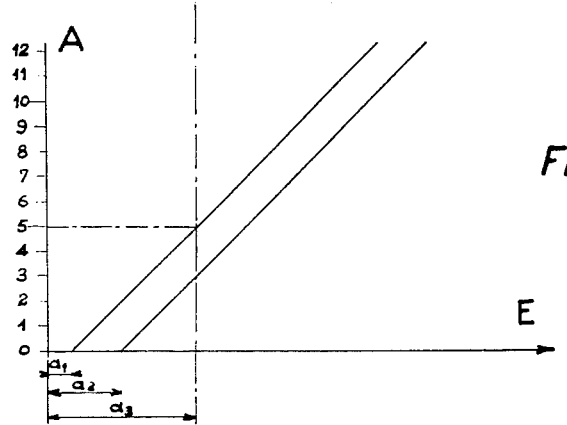
Fig. 8 is the diagram of movement of the element A of Fig. 6 with respect to the said scale of reference E.

Fig. 8 is the movement diagram of the element A, the positions of which are plotted as ordinates with relation to a scale of reference E expressed in steps and shown as abscissae. This diagram shows the two cases of operation of the element A corresponding to the cases of operation of the element B shown in the diagram of Fig. 7.

These two cases of movement are marked by the value of the abscissa for the position 0 of the element A.

The first case relates to the movement of the abscissa $a_1$, the second that of abscissa $a_2$. As in the case of Fig. 6, the element A can co-operate for the change of ratio for its positions from 4.5 to 5.5.

The diagram of Fig. 7 shows an initial movement of the element B marked by the value of the abscissa $b$ for the position 5 of the said element which is modified in two different ways corresponding to the two cases of the element A. In the case in which the element A is given the movement $a_1$, the movement of B accelerates from the position 7.5 to the position 9 and continues at twice the speed. In the case in which the element A has the movement $a_2$, the element B accelerates from the position 9.5 to the position 11 and continues at twice the speed. The first of these two movements at double speed is marked by the abscissa $b_1$ which is that of the said movement referred to the position 5 of the element B; the second of these movements of B at double speed is marked by the abscissa $b_2$ which is that of the said movement referred to the position 5 of the said element B.

The delay of the marked movement $a_2$ of the element A with respect to the marked movement $a_1$, measured in the scale of reference, is $a_2-a_1$. The delay of the marked movement $b_2$ of the element B with respect to the marked movement $b_1$, measured in the same scale of reference E, is $b_2-b_1$. It is clear that $b_2-b_1$ is a linear function of $a_2-a_1$. It may be said that the movement $b_2$ is the movement $b_1$ to which has been added a delay $K(a_2-a_1)$; this is true for several values of $b$, of $a_1$ and of $a_2$. Thus, there is obtained an additive process which is applicable for example to numerical information. In a similar manner, a subtractive process is obtained, when the second speed of the element B is not twice that of the first, but half of it.

The additive effect can be demonstrated by finding the expression of $b_1$ as a function of $b$ and of $a_1$. In the example shown in Figs. 7 and 8, the slopes of the straight line representing the movements of the elements A and B with respect to the scale of reference E are equal to unity, except in the portion of movement at double speed of the element B, for which the slope is equal to 2. The abscissa of the point of intersection of the straight lines representing the movements marked by the abscissae $b$ and $b_1$ is designated by $b_3$. The abscissa corresponding to the same moment for the movement marked by the abscissa $a_1$ is designated $a_3$. It may be written that:

$$b_3=a_3$$

since the origins of the abscissae of the two diagrams are not displaced with respect to each other.

In the diagram of Fig. 8, the ordinate corresponding to the point of the abscissa $a_3$ for the movement $a_1$ is 5, which gives for the expression of $a_3$ as a function of $a_1$:

$$a_3=a_1+5$$

In the diagram of Fig. 7, it is noted that:

$$b_1=\frac{b+b_3}{2}$$

given that the slopes of the straight lines marked by the abscissae $b$ and $b_1$ are respectively 1 and 2.

From these relations, there is derived the expression of $b_1$ as a function of $a_1$ and of $b$:

$$b_1=\frac{b+a_1+5}{2}$$

If the quantity $b$ represents an information $m$ in accordance with the convention:

$$b=2m$$

and if the quantity $a_1$ represents an information $n$ according to the convention:

$$a_1=2n-5$$

there is obtained for $b_1$ the following relation as a function of $m$ and $n$:

$$b_1=m+n$$

which clearly shows the additive nature of the coupling in question.

Figure 9:
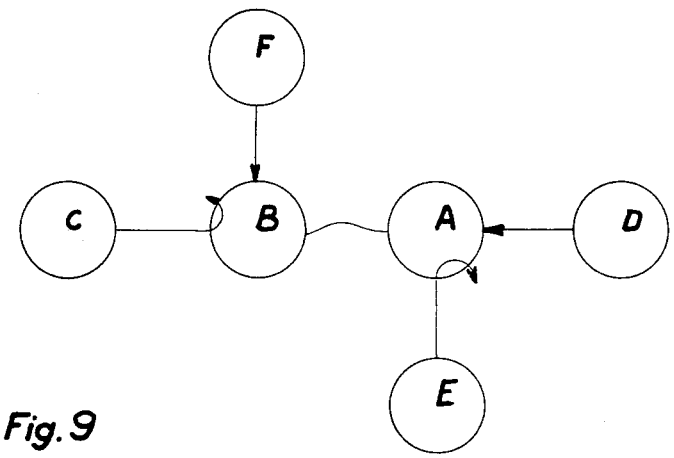
Fig. 9 shows diagrammatically an example of complete control of the said elements A and B.

The introduction of information into such a coupling system may be made by means of various elements, of which the geometric arrangement and the diagram of the couplings of one example of construction are shown in Fig. 9.

The diagrammatic form of representation of the said elements and of their couplings is identical with that employed in the patent application referred to above. There is added thereto the symbol of representation of the coupling forming the object of the present invention, which consists in an undulating line connecting the circles representing the elements between which the said coupling is established.

The element B receives the information from the element F by means of a non-homokinetic coupling, the element F being driven in any known manner or in conformity with the invention.

The element B is driven by the element C in the positions at which it is not controlled by the elements F or A. The element C is homokinetic with the reference element E.

The element A receives the information from the element D by a non-homokinetic coupling, the element D being driven in any known manner or in accordance with the invention.

The element A is driven by the element E in the positions at which it is not controlled by the element D.

It can be seen from Figs. 11 to 14, that the element A is carried by the shaft 34, the element B by the shaft 33, the element C by the shaft 37, the element D by the shaft 35, the element E by the shaft 36, and the element F by the shaft 38.

It is the element E which is taken as the reference element; its rotation expresses the scale of reference with respect to which the movements of the other elements are related.

Figure 16:
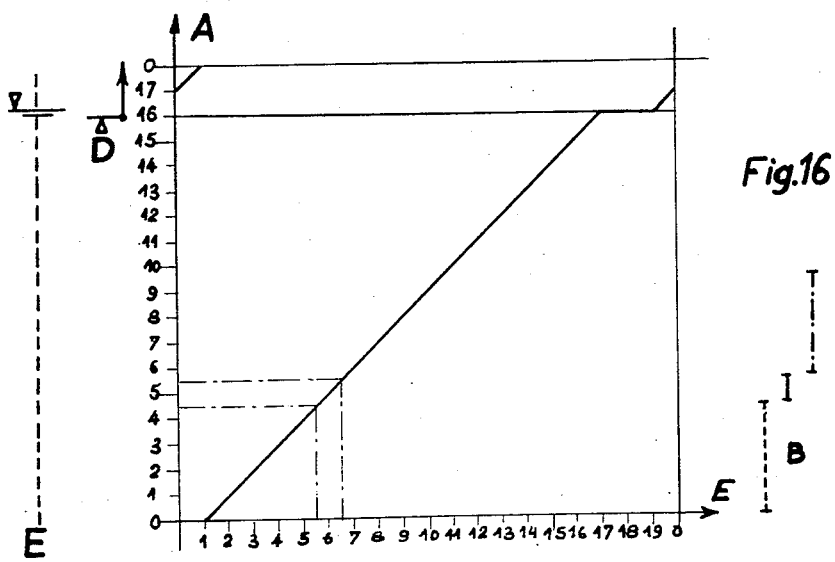
Fig. 16 is a diagram showing a case of operation similar to one of the cases shown in the diagram of Fig. 8, but indicating in addition how the element A receives the information.

The means carried by the elements A and B and shown in Fig. 16 are the same as those of Figs. 1 to 5, but they are represented for other positions of the elements when B is at 2 and A is at 0. In this position, the means do not co-operate. The elements are able to receive information from the elements by which they are controlled, namely the element F for B and the element D for A.

Figure 10:
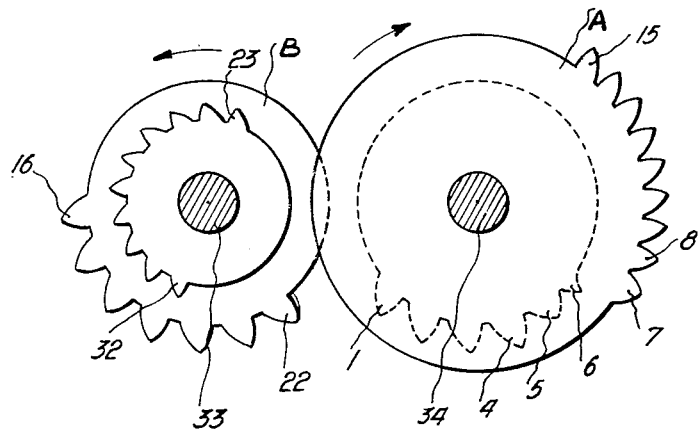
Fig. 10 shows profile views of the means of co-operation shown in Figs. 1 to 5 and carried by the elements A and B.
Figure 11:
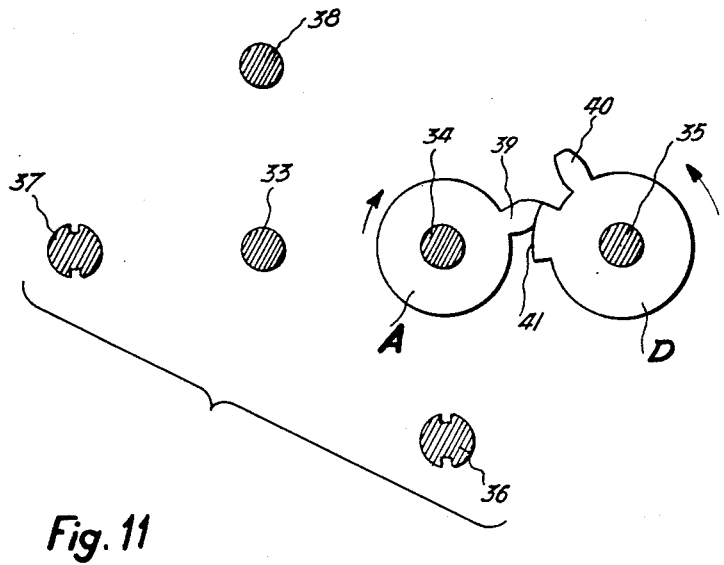
Fig. 11 shows views in profile of the means by which the element A receives information from the element B, the said means being carried by the element A and an element D.

The co-operation between the means shown in Fig. 11 ensures the stopping of the element A at its receiving position 16 and its starting from the said position by the action of the element D. The element A mounted on the shaft 34 is provided, in a third plane not shown in Fig. 10, with a stop tooth 39 co-operating by its chamfered extremity with a blocking surface 31 formed on the element D so as to ensure the blocking of the element A in the direction of its movement. The element D, mounted on the shaft 35, is provided in addition with an excitation means formed by a tooth 40 so as to ensure the starting of the element A by co-operation with the tooth 39 of the said element.

Figure 12:
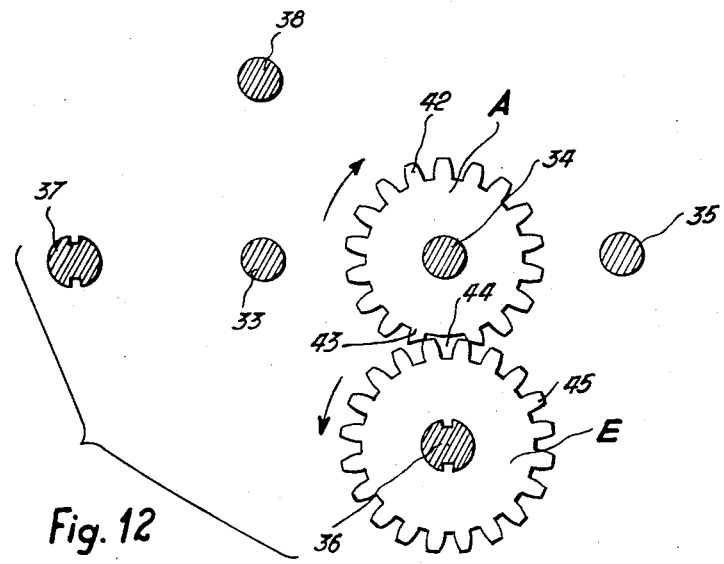
Fig. 12 shows the means by which the element A is driven by the element E, the said means being shown in profile and carried by the element A and the element E.

The co-operation between the means shown in Fig. 12 ensures the blocking of the element A in its receiving position 16 for the reverse direction of its movement and the drive of the said element A when it has left its receiving position 16, by the element E. The element A, mounted on the shaft 34, is provided in a fourth plane with a set of teeth 42 having a space 44 located opposite the element E, when the element A is in the reception position 16. The end tooth 43 is chamfered and co-operates by its chamfered surface with the fictitious cylinder generated by the rotation of the full set of teeth 45 with which is provided the element E mounted on the shaft 36. By this co-operation, the blocking of the element A in the opposite direction of its movement is ensured. When the element A leaves its position 16, it is driven by the teeth 45 of the element E until it returns to the said position 16 after having made one complete revolution.

Figure 13:
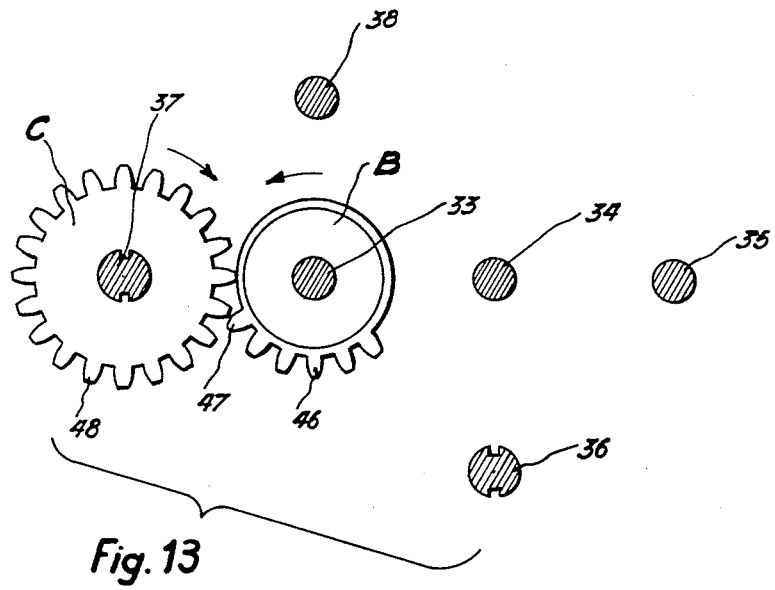
Fig. 13 shows profile views of the driving means for the element B by the element C, carried by the element B and the element C.

The co-operation between the means shown in Fig. 13 ensures the drive of the element B by the element C, when the element B moves from the position 12 to the position 2. The element C also ensures the blocking of the element B in the position 2 for the reverse direction of movement of the said element.

The element C, mounted on the shaft 37 is provided for that purpose with a full set of teeth 48. The element A comprises in a third plane an incomplete set of teeth 46, the absence of teeth corresponding to the positions from 2 to 12. The end tooth 47 co-operates by its chamfered surface with the fictitious cylinder generated by the summits of the teeth 48 of the element C, so as to prevent any return movement of the element B when it is in position 2.

Figure 14:
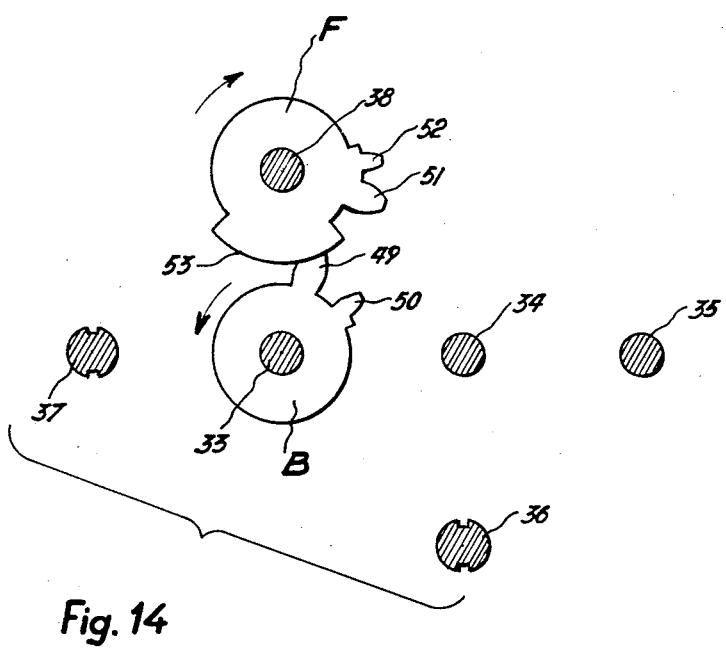
Fig. 14 shows profile views of the means by which the element B receives information from an element F, the said means being carried by the element B and the element F.

The co-operation between the means shown in Fig. 14 ensures the blocking of the element B in the position of reception 2 and, for the direction of its movement, by the element F. The said co-operation also ensures the starting of the element B by the element F and its drive from the position 2 up to the position 5.

The element B carried by the shaft 33 is provided in a plane other than those shown in Fig. 10, with a chamfered tooth 49 capable of co-operating with a blocking surface 53 formed on the element F carried by the shaft 38 in order to ensure the blocking of the element B in the direction of its movement. A tooth 51 carried by the element F ensures the starting of the element B by co-operation with the tooth 49. The tooth 51 is followed by a tooth 52 providing the drive of the element B at least up to the position 5 by co-operation with a tooth 50 following the tooth 49 of the said element.

Figure 15:
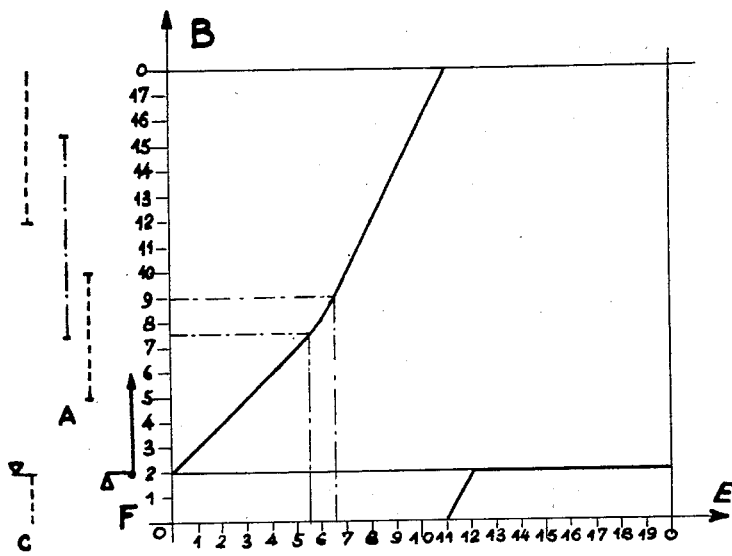
Fig. 15 is a diagram showing one case of operation of the element B similar to one of the cases shown in the diagram of Fig. 7, but showing in addition how the said element receives the information.

The diagram of Fig. 15 shows a case of movement of the element B completed during the course of one full revolution. As ordinates, there are plotted the positions of the element B and as abscissae those of the element E, taken as a reference. In the margin of the ordinates are indicated the nature and the distribution of the means carried by the element B. The dotted line marked by the letter C represents the incomplete set of teeth 46 shown in Fig. 13, the triangle with its point downwards from the position 2 indicates the blocking in the reverse direction applied by the tooth 47 of the said set of teeth. The point followed by a line extending from the position 2 to the position 6 and marked by the letter F, represents the starting means 49 and driving means 50 shown in Fig. 14, and the triangle with its point upwards represents the blocking means 49 in the forward direction, shown in that same figure. The dotted line between the positions 5 and 10 and marked by the letter A shows the driving means 1–4 of so-called low ratio, shown in Fig. 10. The chain-dotted line between the positions 7.5 and 15.5 marked by the letter A represents the driving means 8–15 of the so-called high ratio, shown in Fig. 10.

The position 2 of the element B is that in which it is controlled by the element F from which it receives the first information. In Fig. 15, the information is such that the element B is started from its position 2 to 0 of the scale of reference. Its drive is effected first by the element F, up to about 6, the resumption of the drive by the element A being effected in the vicinity of 5 in order to ensure a good overlap. The acceleration and the drive at double speed up to the position 15 are effected by the element A, as in the case of Figs. 6 and 7. From 15, and with a sufficient overlap, the drive is ensured up to the position 2 by the element C, which rotates constantly and ensures in this position 2 the blocking of reverse movement of the element B. The blocking in the forward direction is effected by the element F.

As has already been shown in the description of Fig. 7, the movement of the element B after the transition at variable ratio to a position in abscissa which depends in a linear manner on the initial information received by the said element in position 2, and on the information received by the element A in position 0 and transmitted to the element B when the element A passes from 4.5 to 5.5. This additive or subtractive property can be utilised for the transmission of an information: it is only necessary that the initial information of the element B should be constant and taken, for example equal to 0, in order that the movement of the said element after the transition to variable ratio may represent the information of the element A, or its complement in the case in which the coupling would be provided so that the movement which follows the transition to variable ratio is that of the smallest speed and not of the greatest.

The diagram of Fig. 16 shows a case of movement of the element A during the course of one complete revolution. The positions of the element A are plotted as ordinates and those of the reference element E as abscissae. In the margin of the ordinates are shown on the left-hand side the means carried by the element A and by which it is driven, and on the right the means carried by the said elements and by which it drives. The dotted line and the triangle with its point downwards marked by the letter E represent the driving means 42 and the blocking means 43 for the reverse direction by the reference element E, shown in Fig. 12. The point followed by a line and the triangle pointing upwards marked by the letter D represent the starting and blocking means 39 shown in Fig. 11. The dotted line in the right-hand margin marked by the letter B represents the driving means 1–4 of the element B, of so-called low ratio, shown in Figs. 1 to 5 and 10, the full line represents the driving means 5—6 of the element B of so-called variable ratio, shown in Figs. 1 to 5 and 10, the chain-dotted line represents the driving means 7 of the element B of so-called high ratio, shown in Figs. 1 to 5 and 10.

In the case of the figure, the element A is stabilised in both directions by the elements D and E, and it is at the position 16 that it receives the information from the element D; this information is such that the element A starts from its position 16 to 19 of the scale of reference.

Figure 17:
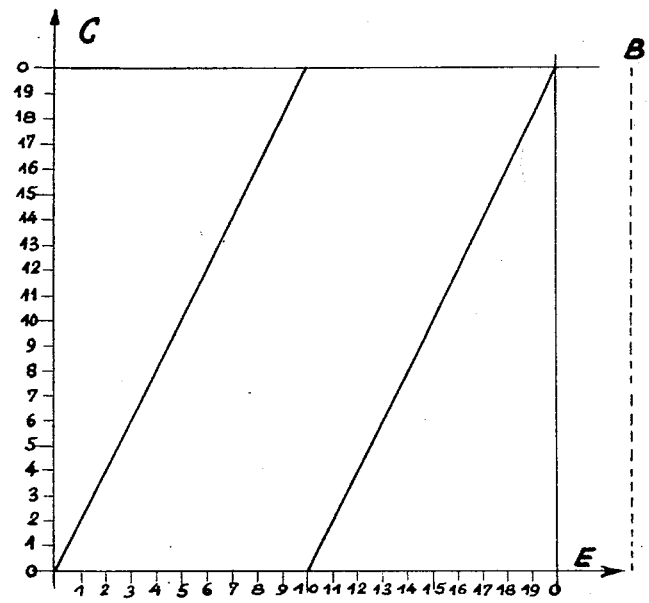
Fig. 17 is a diagram showing the movements of the element C with respect to the scale of reference E.

The diagram of Fig. 17 is that of the movement of the driving element C shown in Fig. 13. As ordinates are plotted the positions of the said element, and as abscissae those of the reference element E. In the left-hand margin, the driving means 48 of the element B shown in Fig. 13 is represented by a dotted line marked by the letter B.

The means which couple the element C homokinetically to the element E in the ratio 2 to 1 have not been shown and may be of any particular kind.

What I claim is:

1. A mechanical system comprising at least one driving wheel adapted to be rotated continuously from a source of power and a plurality of driven wheels, said wheels being mounted for rotation on parallel axes, each of said wheels carrying at least one toothed segment, each of said wheels being peripherally adjacent to at least one other of said wheels, the toothed segments of peripherally adjacent ones of said wheels enabling the latter to cooperate with each other, each of said driven wheels cooperating in each of its positions of rotation, through at least one of its toothed segments, with at least one of the toothed segments of an adjacent wheel, the respective toothed segments of said wheels constituting means for driving each of said wheels homokinetically from said source of power at any moment during its rotation, each of said driven wheels having at least two different angular ranges of movement in which it is driven by different homokinetic chains of said toothed segments at different speeds in relation to the speed of said driving wheel.

2. A mechanical system as claimed in claim 1, the period of one coupling between two adjacent wheels being determined by the length of a toothed segment carried by one of the two wheels, and the end of the coupling effected by said segment being simultaneous with the commencement of a new coupling established between the two same wheels by a different one of said segments located in a different plane.

3. A mechanical system as claimed in claim 2, in which the position of disengagement of the said segment of said one wheel and a segment of the other of said two wheels coincides with the position of engagement of said different segment, so that the position of said first wheel determines the position of the change of coupling and in consequence the change of engagement for a plurality of positions of said second wheel.

4. A mechanical system as claimed in claim 2, the other of said two wheels carrying a plurality of toothed segments respectively in the same planes as cooperating segments on said one wheel, whereby couplings of the so-called first type are effected.

5. A mechanical system as claimed in claim 2, the other of said two wheels having a plurality of toothed segments the teeth of which have the same angular divisions so that the ratios of the modules of the teeth of the segments are proportional to the pitch diameters of the segments.

6. A mechanical system as claimed in claim 2, the number of the teeth of each of the toothed segments of the other of said two wheels being at least equal to the number of the teeth of each of the cooperating segments of said one wheel, increased by the number of positions of enumeration of the signal unit.

7. A mechanical system as claimed in claim 1, in which a first driven wheel carries at least one toothed segment adapted to cooperate successively with toothed segments carried respectively by a second and a third of said driven wheels, so as to effect a change of kinematic chain and a change of form producing a coupling of the so-called second type.

8. A mechanical system as claimed in claim 7, the arc of engagement of said segment of said first wheel being identical to the angle at the center of the segments of said second and third wheels.

9. A mechanical system as claimed in claim 7, said second and said third wheels respectively having toothed segments carried in the same plane and each formed with a number of teeth at least equal to the number of teeth of said wheel increased by the number of positions of enumeration of the memorized signal unit.

References Cited in the file of this patent

UNITED STATES PATENTS

| | | |
|---|---|---|
| 620,630 | Yates | Mar. 7, 1899 |
| 2,356,156 | Golher | Aug. 22, 1944 |
| 2,465,033 | Ocheltree | Mar. 22, 1949 |
| 2,710,129 | Shertz et al. | June 7, 1955 |
| 2,746,312 | Wood | May 22, 1956 |

OTHER REFERENCES

Publication, Ingenious Mechanisms for Designers and Inventors, vol. 1, chap. X, page 307, The Industrial Press, copyright 1930.